(12) United States Patent
Cahen et al.

(10) Patent No.: US 9,675,205 B2
(45) Date of Patent: Jun. 13, 2017

(54) BEVERAGE MACHINE FOR SHORT AND TALL CUPS

(71) Applicant: NESTEC S.A., Vevey (CH)

(72) Inventors: Antoine Cahen, Lausanne (CH); Francois Besson, Colombier (CH)

(73) Assignee: Nestec S.A., Vevey (CH)

( * ) Notice: Subject to any disclaimer, the term of this patent is extended or adjusted under 35 U.S.C. 154(b) by 275 days.

(21) Appl. No.: 14/372,041

(22) PCT Filed: Jan. 9, 2013

(86) PCT No.: PCT/EP2013/050242
§ 371 (c)(1),
(2) Date: Jul. 14, 2014

(87) PCT Pub. No.: WO2013/104636
PCT Pub. Date: Jul. 18, 2013

(65) Prior Publication Data
US 2015/0048729 A1    Feb. 19, 2015

(30) Foreign Application Priority Data

Jan. 13, 2012 (EP) .................................... 12151059
Mar. 1, 2012 (EP) .................................... 12157649

(51) Int. Cl.
*B65B 1/04* (2006.01)
*A47J 31/44* (2006.01)
(Continued)

(52) U.S. Cl.
CPC ........... *A47J 31/4425* (2013.01); *A47B 96/00* (2013.01); *A47J 31/44* (2013.01); *A47J 31/4428* (2013.01);
(Continued)

(58) Field of Classification Search
CPC .. A47J 31/441; A47J 31/4425; A47J 31/4428; A47J 31/4482
(Continued)

(56) References Cited

U.S. PATENT DOCUMENTS 7,210,401 B1   5/2007 Rolfes et
8,091,469 B2   1/2012 Cahen et al.
(Continued)

FOREIGN PATENT DOCUMENTS

CH    388548      6/1965
DE    9109023    11/1992
(Continued)

OTHER PUBLICATIONS

International Search Report for International Application No. PCT/EP2013/050242 dated Mar. 18, 2013.
(Continued)

*Primary Examiner* — Jason K Niesz
(74) *Attorney, Agent, or Firm* — K&L Gates LLP

(57) ABSTRACT

A heightening device (10) is arranged for heightening a short cup (3') under a beverage outlet (20) of a beverage preparation module (2) configured to dispense beverage into a tall cup (3). The device (10) comprises: a bottom (12) for resting on a support surface (5); a platform (14) that is supported by the bottom and that is configured for receiving said short cup (3') and heightening thereof over the bottom (12); and a means (15,16) for assembling the bottom and the platform as a unit (12, 14) to a corresponding assembling means (25, 26) of said beverage preparation module under said outlet. The assembling means (15, 16; 25, 26) of such device (10) and of the module (2) are disassemblable for separating the unit (12, 14) from the module and removing the unit from under such beverage outlet (20) to allow placement of the tall cup (3) on said support surface (5) under the outlet (20).

7 Claims, 1 Drawing Sheet

(51) Int. Cl.
*A47B 96/00* (2006.01)
*F16M 13/02* (2006.01)

(52) U.S. Cl.
CPC ........ *A47J 31/4482* (2013.01); *F16M 13/022* (2013.01)

(58) Field of Classification Search
USPC .......................................................... 141/378
See application file for complete search history.

(56) References Cited

U.S. PATENT DOCUMENTS

| | | | |
|---|---|---|---|
| 2008/0148950 A1 | 6/2008 | Cahen et al. | |
| 2008/0216667 A1 | 9/2008 | Garman et al. | |
| 2011/0107918 A1 | 5/2011 | Santy et al. | |
| 2012/0000933 A1 | 1/2012 | Cahen et al. | |
| 2012/0285331 A1* | 11/2012 | Mori ................... | A47J 31/4403 99/285 |
| 2013/0112318 A1* | 5/2013 | Rithener ............. | A47J 31/4482 141/376 |

FOREIGN PATENT DOCUMENTS

| | | |
|---|---|---|
| DE | 29810291 | 9/1998 |
| EP | 234997 | 7/2011 |
| WO | 2009013778 | 1/2009 |
| WO | 2009135034 | 11/2009 |
| WO | WO2010031665 | 3/2010 |
| WO | 2011012489 | 2/2011 |
| WO | 2011154492 | 12/2011 |

OTHER PUBLICATIONS

International Written Opinion for International Application No. PCT/EP2013/050242 dated Mar. 18, 2013.
Flavia Creation 400 User Guide UK, 2008, 70-41-2651 Issue 3, 17 pages.
Photograph of Flavia Creation 400 machine with removed driptray (2 pages).
Photograph of Flavia Creation 400 machine with assembled driptray (2 pages).
"Vending Times" Issue Date Nov. 2009, vol. 49, No. 11 (2 pages).
Flavia Creation 400 Guide Utilisateur, Gebrauchsanweisung, Francais/Deutsch 2008, 70-41-2761, Issue 3 (16 pages).
Print from http://www.yopi.de/—Siemens TK 911 N2 (2 pages).
Siemens TK 911 N2 Operating Instructions, Mar. 29, 2006 (108 pages).
Screenshot at 0:35 of Youtube video "Morphy Richards Meno One Cup—Which? first look" (1 page).
Morphy Richards Meno One Cup KT43922 Machine User Manual, Jan. 6, 2010 (8 pages).
Internet Archive Wayback Machine—Morphy Richards Kettle Instruction Booklets, Oct. 13, 2011 (1 page).
Internet Archive Wayback Machine—Bunn Coffee Equipment, Oct. 5, 2011 (3 pages).
Internet Archive Wayback Machine—www.myflavia.fr Support Guides, Oct. 12, 2010 (1 page).
Internet Archive Wayback Machine—www.partsguru.com, Nov. 26, 2011 (1 page).
Internet Archive Wayback Machine—www.morphyrichards.co.uk Instruction Booklets IB Kettles, Oct. 13, 2011 (1 page).
Internet Archive Wayback Machine—Illustrated Parts & Operating Service Manuals, Nov. 20, 2010 (2 pages).
Youtube Video uploaded on Mar. 12, 2010 at https://www.youtube.com/watch?v=16bqnznh-RE (6 pages).
Internet Archive Wayback Machine—Flavia Creation 400 Guide, Oct. 12, 2010 (1 page).
Parts diagram of "Gaggia Classic" Machine (3 pages).
Parts diagram of "Gaggia Classic" Machine (2 pages).
"Gaggia Through the Years" printed from the Internet at http://www.gaggia-usa.com/story/gaggia-timeline/nav/3 (4 pages).
Photo of Disassembled Gaggia Classic Coffee Machine Body (1 page).
Illustrated parts catalog of the BUNN AutoPOD Brewer (19 pages).
BUNN MyCafe AP AutoPOD Auto Eject Pod Brewer (2 pages).
Installation and Operating Gude of the BUNN AutoPod Brewer (15 pages).
Youtube Video uploaded on Jun. 25, 2010 at https://www.youtube.com/watch?v=6Vsq-qO2Vac (11 pages).
European Patent Office Opposition Communication for Application No. EP2802244, Dated Jan. 9, 2017, 16 pages.

\* cited by examiner

BEVERAGE MACHINE FOR SHORT AND TALL CUPS

CROSS REFERENCE TO RELATED APPLICATIONS

The present application is a National Stage of International Application No. PCT/EP2013/050242, filed on Jan. 9, 2013, which claims priority to European Patent Application No. 12151059.8, filed Jan. 13, 2012, and European Patent Application No. 12157649.0, filed Mar. 1, 2012, the entire contents of which are being incorporated herein by reference.

FIELD OF THE INVENTION

The field of the invention pertains to beverage dispensing machines configured for tall cups and having a support arrangement for short cups.

BACKGROUND ART

Certain beverage preparation machines use capsules containing ingredients to be extracted or to be dissolved; for other machines, the ingredients are stored and dosed automatically in the machine or else are added at the time of preparation of the drink.

Most beverage machines possess within a housing: filling means that include a pump for liquid, usually water, which pumps the liquid from a source of water that is cold or indeed heated through heating means, such as a heating resistor, a thermoblock or the like, a brewing unit in which an ingredient is brewed with water or a mixing unit in which ingredients are mixed together, and a beverage outlet for dispensing the prepared beverage. Typically, the beverage outlet is located above a grid for supporting a cup or other recipient under the outlet and for the passage of possible drips from the beverage outlet or other spills into a collector tray located under the grid.

For example, EP 1 440 639 discloses a beverage machine comprising a receptacle stand having a hollow interior forming a drip tray. An upper surface of the receptacle stand is provided with a grill on which the receptacle is positioned. The drip tray is removable from the housing to ease emptying of the collected water.

Drip tray devices with cup supports are well known in the art. There are also such devices that are further arranged for allowing the adjustment of the vertical position under the beverage outlet of cups of different sizes. For instance, EP 0 549 887 and U.S. Pat. No. 5,161,455 disclose devices with an adjustable cup support for small and large receptacles. Further exemplary cup supports are disclosed in DE9109023, DE29810291 and EP2342997.

U.S. Pat. No. 5,353,692 discloses a beverage vending machine having a cup station with an upper beverage outlet and a bottom drain-gate on a drip collector. Above the drain gate, the cup station has a retractable support member for positioning small cups under the beverage outlet. This cup station is formed as a grid for allowing the passage of drips down to the drain-gate.

EP 1 731 065 discloses a beverage machine that has a drip tray device located under a beverage outlet. This device has a first support grid for a first beverage recipient covering a drip tray or collection tank. The first support grid is removable form the drip tray to give access to a second support thereunder for supporting a larger cup under the outlet. Moreover, the drip tray supports a receptacle for used capsules and can be removed en bloc with the cup support arrangement from the machine for emptying the capsule receptacle and the drip tray.

EP 1 867 260 discloses a drip tray with a cup support that is movably mounted, generally at mid-height, onto a beverage machine. The cup support has an operative horizontally extending position for positioning a small cup under the machine's beverage outlet and can be pivoted upwards against the machine's main body or otherwise moved so as to give sufficient space for positioning a large cup under the beverage outlet on a support surface located below this above movable cup support. Cup supports of the same are disclosed in WO2011/154492 and PCT/EP11/061272.

Likewise, WO 2009/074557 discloses a beverage preparation machine with a cup support and drip tray device located under a machine's beverage outlet. The device has a drip tray arrangement for evacuating liquid and for supporting a cup below the outlet and has an extension for hygienically supporting cups upon use.

In WO 2009/074559, a similar beverage machine is disclosed in which the cup support and drip tray device has a reservoir for collecting ingredient capsules upon use. The device includes an arrangement for unjamming the system when the reservoir is so over-filled with used capsules as to interfere with the structure of the machine and to prevent removal of the device with the over-filled receptacle.

WO 2010/031665 discloses a beverage preparation machine with a separable semi-cocoon-shaped device for receiving a cup support device of complementary shape, the cup support device having a liquid permeable surface and a liquid collector therebelow. The cup support device has a connector for disconnectably connecting it at two different heights in the receiving device above an inner bottom face of the receiving device, the inner bottom face extending under substantially the entire cup support device. The presence of the cup support device displaceable vertically in the receiving device prevents a premature soling of the inner surfaces of the receiving device. It follows that the receiving device is not designed or intended for use without the cup support device. The receiving device can be removed from the machine and the cup support device can be removed from the receiving device for servicing, e.g. cleaning, and/or for an exchange of these devices by similar devices of different designs.

SUMMARY OF THE INVENTION

The invention thus relates to machines for dispensing a beverage from a beverage outlet to cups of different sizes, in particular to short cups, e.g. espresso cups, and tall cups such as mugs, e.g. cappuccino cups.

For the purpose of the present description, a "beverage" is meant to include any human-consumable liquid substance, such as tea, coffee, hot or cold chocolate, milk, soup, baby food, etc. . . . . A "capsule" is meant to include any pre-portioned beverage ingredient, such as a flavouring ingredient, within an enclosing packaging of any material, in particular an airtight packaging, e.g. plastic, aluminium, recyclable and/or biodegradable packagings, and of any shape and structure, including soft pods or rigid cartridges containing the ingredient. The capsule may contain an amount of ingredient for preparing a single beverage serving or a plurality of beverage servings.

The beverage preparation machine can be an in-home or out of home machine. The machine may be a coffee, tea, chocolate, cacao, milk, soup, baby food, etc. . . . preparation machine. The machine may be arranged for preparing within a beverage processing module a beverage by passing hot or cold water or another liquid through a capsule containing an ingredient, such as a flavouring ingredient, of the beverage to be prepared, such as ground coffee or tea or chocolate or cacao or milk powder.

The beverage preparation typically includes the mixing of a plurality of beverage ingredients, e.g. water and milk powder, and/or the infusion of a beverage ingredient, such as an infusion of ground coffee or tea with water. One or more of such ingredients may be supplied in loose and/or agglomerate powder form and/or in liquid form, in particular in a concentrate form. A carrier or diluents liquid, e.g. water, may be mixed with such ingredient to form the beverage.

For instance, a predetermined amount of beverage is formed and dispensed on user-request, which corresponds to a serving. The volume of such a serving may be in the range of 25 to 200 ml and even up to 300 or 400 ml, e.g. the volume for filling a cup, depending on the type of beverage. Formed and dispensed beverages may be selected from ristrettos, espressos, lungos, cappuccinos, Latte Macchiato, café latte, americano coffees, teas, etc. . . In particular, a coffee machine may be configured for dispensing espressos, e.g. an adjustable volume of 20 to 60 ml per serving, and/or for dispensing lungos, e.g. a volume in the range of 70 to 150 ml per serving.

According to a particular aspect, the invention relates to a heightening device for heightening a short cup under a beverage outlet of a beverage preparation module that is arranged to dispense a beverage into a tall cup.

The placement surface for such a tall cup and for the heightening device under the beverage outlet can be a surface external to the machine, e.g. the surface of a table on which the beverage preparation module is placed. Alternatively, the beverage preparation module may include under its beverage outlet a foot on which either a tall cup or the heightening device can be placed.

The heightening device of the invention comprises: a bottom for resting on a support surface, in particular a support surface external to the module or part of the module; a platform that is supported by the bottom and that is configured for receiving the short cup and heightening thereof over the bottom; and a means for assembling the bottom and the platform as a unit to a corresponding assembling means of such beverage preparation module under such outlet.

In accordance with the invention, the assembling means of the heightening device and of such beverage preparation module are disassemblable for separating the unit from the module and removing the unit from under said beverage outlet to allow placement of the tall cup on the support surface under the beverage outlet.

Hence, the heightening device is provided as a support for a short cup to raise such short cup under a beverage outlet of a beverage preparation module that is positioned at height for delivering a beverage into a tall cup. When a tall cup is used, the heightening device can be separated from the beverage preparation module and moved away to leave a free spot to place the tall cup under the beverage outlet.

Typically, the heightening device has a generally upright wall for spacing the platform over the bottom. The sidewall may be connected to the bottom and form therewith a receptacle having a cavity for collecting liquid. The platform may be made removable from the device to access the receptacle, for instance for emptying the receptacle. The assembling means of the heightening device can be mounted to or comprised in or formed by the upright wall.

Typically, the platform comprise an arrangement for draining liquid through the platform, in particular a grid-like arrangement.

Any assembling means is contemplated, e.g. snap or hook or bayonet assembly means.

In an embodiment of the invention, the device assembling means comprises: a magnet element that is arranged to be magnetically constrained against a corresponding ferromagnetic element of said module assembling means; and/or a ferromagnetic element that is arranged to be magnetically constrained against a corresponding magnet of said module assembling means.

Optionally, such device comprises a support member, such as a generally upright sidewall, supporting the magnetic or ferromagnetic device element, which element has an apparent face for cooperating with and facing the module assembling means, such apparent face being recessed in the support member or protruding out therefrom.

Such a magnet element generates a magnetic field. A suitable magnet element may be a permanent magnet, e.g. made of iron, nickel, cobalt, rare earth metals, e.g. lanthanide, and alloys and oxides containing such metals as well as polymers (e.g. plastics) carrying such elements and components. It is also possible to use an electromagnet as a magnet element.

A suitable ferromagnetic element may be made of at least one of Co, Fe, $Fe_2O_3$, $FeOFe_2O_3$, $NiOFe_2O_3$, $CuOFe_2O_3$, $MgOFe_2O_3$, $Nd_2Fe_{14}B$, Mn, Bi, Ni, MnSb, $MnOFe_2O_3$, $Y_3Fe_5O_{12}$, $CrO_2$, MnAs, Gd, Dy, EuO, $Cu_2MnAl$, $Cu_2MnIn$, $Cu_2MnSn$, $Ni_2MnAl$, $Ni_2MnIn$, $Ni_2MnSn$, $Ni_2MnSb$, $Ni_2MnGa$, $Co_2MnAl$, $Co_2MnSi$, $Co_2MnGa$, $Co_2MnGe$, $SmCo_5$, $Sm_2Co_{17}$, $Pd_2MnAl$, $Pd_2MnIn$, $Pd_2MnSn$, $Pd_2MnSb$, $Co_2FeSi$, $Fe_3Si$, $Fe_2VAl$, $Mn_2VGa$ and $Co_2FeGe$.

The magnet and/or the ferromagnetic element of the device assembling means can be mounted in a hole, such as a through-hole or a blind hole, optionally force-fitted or glued or screwed in such a hole, of a non-ferromagnetic element such as a non-ferromagnetic or magnetically indifferent wall or support element. Other assembly and connection methods are of course possible.

Another aspect of the invention relates beverage preparation machine that comprises: a beverage preparation module having a beverage outlet; and a heightening device as described above. The module has a module assembling means under the outlet for disassemblable assembly to the device assembling means.

In a particular embodiment of the invention, the module comprises further module assembling means for disassemblable assembly of the device assembling means. Such further modules assembling means are so located that when the device assembling means are assembled thereto the unit of the device is located away from under beverage outlet.

Hence, such further module assembling means can be used to secure the heightening device in a rest position, i.e. when not in use under the machine's beverage outlet.

The beverage outlet and the module assembling means can be located on a first face of the machine. The further module assembling means may be located on one more second faces of the machine. Optionally, the first face forms a machine front face and the second face(s) form(s) at least one of a machine side face and a machine rear face.

The module can have a cavity for receiving a service device bearing at least one of: the module assembling means and the further module assembling means. in particular a service device for supplying a consumable substance and/or for collecting a used or waste substance.

Typically, the service device is configured for collecting at least one of: one or more waste beverage ingredients, such as a used flavouring ingredient and/or waste water; one or more used capsules for supplying a beverage ingredient into beverage preparation module; and a cleaning agent, such as a cleaning, rinsing or descaling liquid. A suitable service device may be configured for storing a supply of the abovementioned beverage ingredients and/or capsules before use or a supply of the abovementioned cleaning agent before use.

For instance, the service device comprises at least one of: a drawer configuration for being slidable into and out of the module; a handle for manually moving the service device in an out of the module; and a first receptacle for containing a first substance and a second receptacle for containing a second substance, such as a lower receptacle and an upper receptacle, in particular a lower receptacle for containing liquid and an upper receptacle for containing a solid.

The service device may include a handle that forms at the same time the module assembly means or part thereof or a support for the module assembly means.

When the service device is movable, in particular slidable in and out of the module, it can be secured in the beverage preparation module to resist disassembly of the assembling means of the beverage preparation module and the heightening device assembling means.

For example, the service device may be secured in the module's cavity by a snap or a magnetic connector or another assembling means that is stronger than the connection force of the assembled assembling means of the heightening device and corresponding assembling means of the module. Hence, when the assembly means of the module, i.e. part of the service device, and of the heightening device are separated, the service device stays in place in the cavity of the module.

The module typically has a bottom. The heightening device bottom and the module bottom may be both arranged to rest on a same support surface and to be supported thereby during use. The bottoms resting on the support surface are in particular adjacent to each other during use. Such a support surface for the bottoms can be a kitchen or dining table or any generally stable and horizontal surface that is able to support the weight of the beverage preparation machine.

The module and the heightening device can be magnetically constrainable together by the module assembling means and the (heightening) device assembling means.

The device assembling means can have a magnetic field-generating element and the module assembling means may have a ferromagnetic element and/or vice versa. Typically during use (e.g. under the beverage outlet) or rest (e.g. stored against the beverage module away from the use position) of the heightening device, the field-generating element of the device can have an average magnetic field axis that is off-set above an average magnetic field axis of the module so that the heightening device is urged downwards by the module.

In one embodiment, the device comprises a device support member, such as a generally upright wall, and the module comprises a module support member, such as a wall of a module housing or of a service device. The device support member supports a device element and the module support member supports a module element. These device and module elements form the module and device assembling means and are magnetically constrainable together. When the device element and the module element are magnetically constrained together:
- the device element, in particular an apparent face thereof, is recessed in an recess of the device support member and the module element, in particular an apparent face thereof, protrudes away from the module support member so that the module element, in particular the apparent module face, extends into the device recess, in particular to or towards the apparent device face; or
- the device element, in particular an apparent face thereof, protrudes away from the device support member and the module element, in particular an apparent face thereof, is recessed in a recess of the module support member so that the device element, in particular the apparent device face, extends into the module recess, in particular to or towards the apparent module face.

In the context of the present disclosure, the relative orientation of the machine, e.g. references to the machine's top, front, bottom, side, rear, etc., unless specified otherwise, typically relate to the orientation of operation of the machine, e.g. on top of a table, with the machine in front of a user for naturally operating the machine to dispense a beverage.

BRIEF DESCRIPTION OF THE DRAWINGS

The invention will now be described with reference to the schematic drawings, wherein.

DETAILED DESCRIPTION

Figure 1:
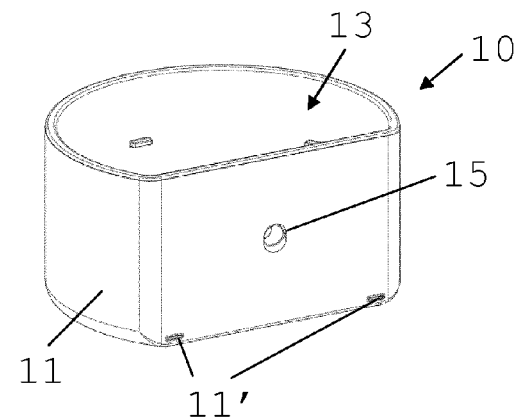
FIG. 1 is a perspective view of part of a heightening device according to the invention, the device being shown without its platform.

FIGS. 1 to 3B illustrate particular embodiments of the present invention, in particular an embodiment of a heightening device 10 and an embodiment of a beverage preparation machine 1 formed of a beverage preparation module 2 cooperating with heightening device 10.

Machine 1 can be electrically powered, typically by the mains, via an electric cord.

Beverage preparation module 2 typically includes an internal circuit for circulating liquid, e.g. water, from reservoir or tank (not shown). Further details on suitable tanks and reservoirs are for example disclosed in WO2007/135136, WO 2010/128109, WO 2011/083103, WO 2011/089210 and EP 2 228 633.

Alternatively, module 2 may be connected directly to the tap. Module 2 is covered by a housing 21 and has a bottom 22.

Module 2 can be arranged for holding a flavouring ingredient, in particular a pre-portioned ingredient such as an ingredient supplied to such module within a capsule, and circulating a liquid therethrough to form a beverage. Examples of such modules are disclosed in WO 2009/074550 and in WO 2009/130099, the teachings of which are hereby incorporated by way of reference.

The beverage, upon formation, can be dispensed via beverage outlet 20 to a dispensing area 6, e.g. typically located on or above a support 5 beverage preparation machine 1. During use, heightening device 10 is typically located in dispensing area 6.

Heightening device 10 is arranged for heightening a short cup 3' under a beverage outlet 20 of a beverage preparation module 2 arranged to dispense beverage into a tall cup 3.

The placement surface for such a tall cup 3 and for heightening device 10 under beverage outlet 20 can be a surface external to the machine, e.g. a portion of the surface of support 5 such as a table on which beverage preparation module 2 is placed. Alternatively, the beverage preparation module includes a foot extending under the beverage outlet on which either the tall cup or the heightening device can be placed.

Heightening device 10 comprises:
- a bottom 12 for resting on support surface 5, such as surface external to the machine or a surface of a foot of the module;
- a platform 14 that is supported by bottom 12 and that is configured for receiving short cup 3' and heightening short cup 3' over the bottom 12, e.g. typically by 1 to 10 cm such as 2 to 7 cm; and
- a means 15,16 for assembling bottom 12 and platform 14 as a unit 12,14 to a corresponding assembling means 25,26 of module 2 under outlet 20.

Platform 14 comprises an arrangement for draining liquid through platform 14, in particular a grid-like arrangement. For instance, platform 14 includes an arrangement of a plurality of through-holes. A larger through-hole, e.g. having a diameter in the range of 0.5 to 1.5 mm, may be provided vertically under outlet 20 when heightening device is in use thereunder, so as to avoid massive spills on platform 14 should a cup 3' be removed from platform before the end of a beverage dispensing cycle. In this case, beverage would flow directly through platform 14 via the larger through-hole without soiling the platform.

In accordance with the invention, assembling means 15,16;25,26 of device 10 and of module 2 are dissassemblable for separating unit 12,14 from said module 2 and removing unit 12,14 from under beverage outlet 20 to allow placement of tall cup 3 under outlet 20.

Typically, heightening device 10 has a generally upright wall 11 for spacing platform 14 over bottom 12. Sidewall 11 can be connected to bottom 12 and form therewith a receptacle having a cavity 13 for collecting liquid. For instance, sidewall 11 is assembled to or integral with bottom 12. The device assembling means 15,16 may be mounted to or comprised in or formed by upright wall 11.

In a particular embodiment, device assembling means 15,16 may include:
- a magnet element 16 that is arranged to be magnetically constrained against a corresponding ferromagnetic element 26 of module assembling means 25,26; and/or
- a ferromagnetic element that is arranged to be magnetically constrained against a corresponding magnet of a module assembling means.

Magnet 16 and/or ferromagnetic element of device assembling means 15,16 can be mounted in a hole, such as a through-hole or a blind hole 15, of a non-ferromagnetic element such as a non-ferromagnetic wall 11, e.g. a plastic wall.

Likewise, element 26,26'26" may be mounted in a hole, such as a through-hole 25 or a blind hole, of a non-ferromagnetic element such as a non-ferromagnetic housing 21 or of a service device 23 as discussed below, e.g. made of plastic. Module 2 typically has a housing 21 provided with support bumps 21' about elements 26,26'26" for a proper positioning of heightening device 10 thereagainst, as illustrated in FIGS. 3A and 3B In a particular embodiment of the invention, module comprises further module assembling means 25,26',26" for disassemblable assembly of the assembling means 15,16 of heightening device 10. Such further module assembling means 25,26',26" can be so located that, when device assembling means 15,16 are assembled thereto, unit 12,14 of device 10 is located away from under beverage outlet 20. Hence, heightening device 10 may be secured against module 2 under outlet 20 in a use (or operative) position, and it can also be secured in a rest position against module 2 away from under outlet 20.

Beverage outlet 20 and module assembling means 25,26 can be located on a first face 20' of machine 2. The above further module assembling means 25,26',26" may be located on one more second faces 20" of the machine, in particular the first face may form a machine front face 20' and the second face(s) may form at least one of a machine side face 20" and a machine rear face.

Walls 11 may bear support members or extensions 11' that rest against faces 20',20" when heightening device 10 is placed thereagainst.

Figure 2:
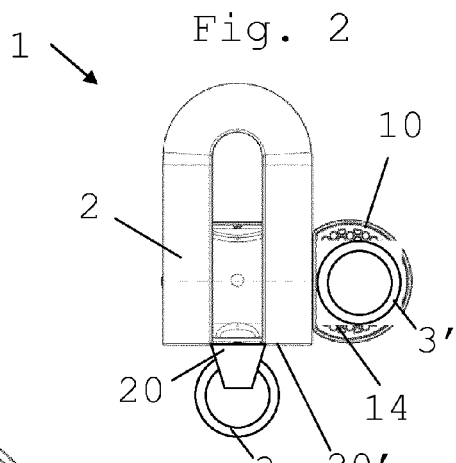
FIGS. 2 and 3 are top and front views of the beverage preparation machine including the heightening device of FIG. 1.
Figure 3:
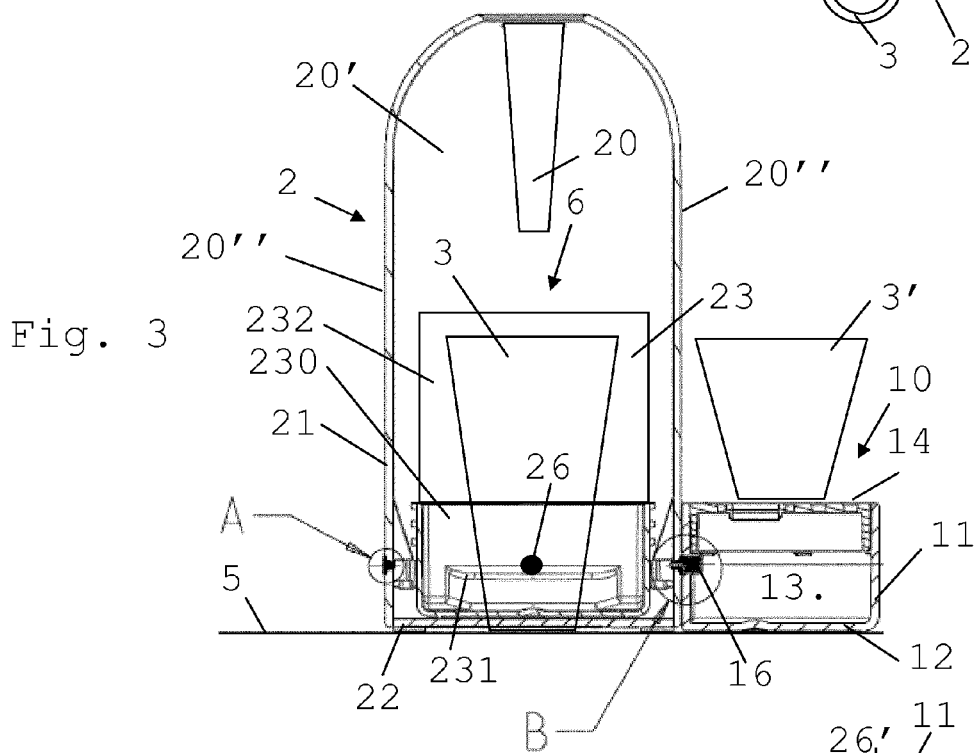
Figure 3A:
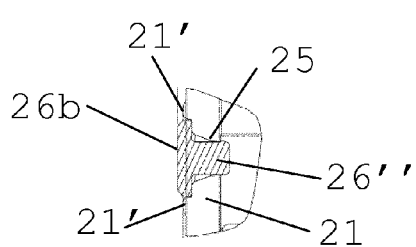
FIGS. 3A and 3B are enlarged views of Details A and B indicated in FIG. 3
Figure 3B:
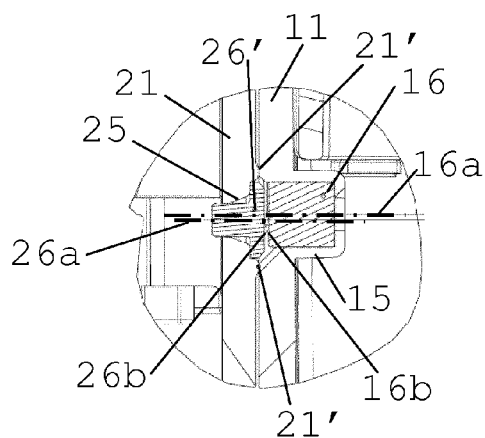

In FIGS. 2 and 3, heightening device 10 is shown in its rest position against a side face 20" of module 2.

Furthermore, module 2 may have a cavity for receiving a service device 23 bearing at least one of module assembling means 25,26 and such further module assembling means 25,26',26", in particular a service device 23 for supplying a consumable substance and/or for collecting a used or waste substance. In FIG. 3, module 2 is shown with a service device 23 bearing module assembling means 25,26 for assembling heightening device under beverage outlet 20. Alternatively, it is also possible to position the service device adjacent a rest position of the heightening device.

Service device 23 may comprise at least one of:
- a drawer configuration for being slidable into and out of module 2;
- a handle 231 for manually moving service device 23 in an out of module 2; and
- a first receptacle 230 for containing a first substance and a second receptacle 232 for containing a second substance, such as a lower receptacle 230 and an upper receptacle 232, in particular a lower receptacle for containing liquid and an upper receptacle for containing a solid.

As illustrated in FIG. 3, assembling means 26 are mounted in handle 231.

For example, service device 23 may be secured in the module's cavity by a snap or a magnetic connector or another assembling means that is stronger than the connection force of the assembled assembling means 15,16 of heightening device 10 and corresponding assembling means 26,27 of module 2. Hence, when the assembly means of module 1, i.e. part of service device 23, and of heightening device 10 are separated, service device 23 stays in place in the cavity of module 2. An example of a suitable arrangement for holding service device 23 in the cavity of module 2 is disclosed in WO 2011/086087.

Service device 23 may be arranged in module 2 for collecting used ingredients, such as tea leaves or ground coffee, e.g. within used capsules, and waste liquid. Service device 23 may include a collector in an upper receptacle 232 for solids and a lower compartment 230 for liquids. Service device 23 is insertable, e.g. slidable, into a seat or cavity formed in module 2 and removable therefrom for servicing, e.g. emptying the solids and/or liquids contained therein. For example, the storage capacity of collector 232 for a used ingredient may be aligned to the storage capacity of a liquid supply reservoir such as a water reservoir, e.g. as taught in WO 2010/128109. A service device safety mechanism that can be adapted to the present device is disclosed in WO 2011/086087 and in WO 2011/086088.

Service device 23 may be positioned in a lower part of beverage preparation module to collect upon beverage preparation a used flavouring ingredient evacuated to device 23, e.g. by gravity, for instance from an ingredient brewing or mixing unit. Examples of suitable brewing unit configurations are for example disclosed in EP 1 646 305, EP 1 859 713, EP 1 859 714 and WO 2009/043630.

Device 23 typically has an anti-clogging arrangement, as for example taught in WO 2009/074559 and in WO 2009/135869, which are hereby incorporated by way of reference.

Beverage preparation module 2 typically includes one or more of the following components:
a) the ingredient holder, such as a brewing unit, for receiving the flavouring ingredient of this beverage, in particular a pre-portioned ingredient supplied within a capsule, and for guiding an incoming flow of liquid, such as water, through this ingredient to beverage outlet 20;
b) an in-line heater, such as a thermoblock, for heating this flow of liquid to be supplied to the ingredient holder;
c) a pump for pumping liquid through the in-line heater;
d) one or more fluid connecting members for guiding liquid from a source of liquid, such as tank of liquid, to beverage outlet 20;
e) an electric control unit, in particular comprising a printed circuit board (PCB), for receiving instructions from a user via an interface and for controlling the in-line heater and the pump; and
f) one or more electric sensors for sensing at least one operational characteristic selected from characteristics of the ingredient holder, the in-line heater, the pump, liquid reservoir, service device 23, a flow of liquid, a pressure of liquid and a temperature of liquid, and for communicating such characteristic(s) to the control unit.

The heater may be a boiler, thermoblock or an on demand heater (ODH), for instance an ODH type disclosed in EP 1 253 844, EP 1 380 243 and EP 1 809 151. Examples of suitable brewing units and capsule management are for example disclosed in WO 2005/004683, WO2007/135136 and WO 2009/043630, which are hereby incorporated by way of reference. Suitable beverage preparation modules are for instance disclosed in WO 2009/074550 and WO 2009/130099, which are hereby incorporated by way of reference.

Module 2 typically has a bottom 22. The heightening device bottom 12 and module bottom 22 can be both arranged to rest on a same support surface 5 and to be supported thereby during use. Bottoms 12,22 are in particular adjacent to each other during use.

A mentioned above, module 2 and heightening device 10 can be magnetically constrainable together by the module assembling means 25,26 and the device assembling means 15,16. Device assembling means 15,16 may have a magnetic field-generating element 16 and module assembling means 25,26 can have a ferromagnetic element 26,26',26" and/or vice versa. Element 16 of heightening device 10 may have an average magnetic field axis 16a that is off-set above an average magnetic field axis 26a of the module 2 so that heightening device 10 is urged downwards by module 2, e.g. onto support surface 5 so that the positioning of heightening device 10 is safe on surface 5.

In a particular embodiment, device 10 comprises a device support member 11, such as a generally upright wall 11 as discussed above, and module 2 comprises a module support member 21,23, such as a wall of a module housing 21 or of a service device 23 as discussed above. Device support member 11 supports a device element 16 and module support member 21,23 supports a module element 26,26', 26". Device element 16 and module element 26,26',26" form the module and device assembling means and are magnetically constrainable together. When device element 16 and module element 26,26',26" are magnetically constrained together:
device element 16, in particular an apparent face 16b thereof, is recessed in an recess 15 of the device support member 11 and module element 26,26',26", in particular an apparent face 26b thereof, protrudes away from module support member 21,23 so that the module element, in particular apparent module face 26b, extends into device recess 15, in particular to or towards apparent device face 16b; or
the device element, in particular an apparent face thereof, protrudes away from the device support member and the module element, in particular an apparent face thereof, is recessed in a recess of the module support member so that the device element, in particular the apparent device face, extends into the module recess, in particular to or towards the apparent module face.

The invention claimed is:

1. A beverage preparation machine comprising:
a beverage preparation module comprising a beverage outlet, a first module assembling member under the beverage outlet, and a second module assembling member; and
a heightening device for increasing a height of a short cup under the beverage outlet of the beverage preparation module, the heightening device comprising
a bottom for resting on a support surface,
a platform supported by the bottom and configured for receiving the short cup and increasing the height of the short cup over the bottom,
a device assembling member for connecting the bottom and the platform as a unit to each of the first module assembling member and the second module assembling member and for disconnecting the unit from each of the first module assembling member and the second module assembling member, the second module assembling member located such that when the device assembling member is assembled thereto, the unit of the heightening device is located away from under the beverage outlet.

2. The beverage preparation machine of claim 1, wherein the beverage preparation module has a cavity for receiving a service device bearing at least one of the first module assembling member and the second module assembling member.

3. The beverage preparation machine of claim 2, wherein the service device comprises at least one of:
a drawer configuration for being slidable into and out of the beverage preparation module;
a handle for manually moving the service device in an out of the beverage preparation module; and
a first receptacle for containing a first substance and a second receptacle for containing a second substance.

4. The beverage preparation machine of claim 1, wherein the beverage preparation module has a module bottom, and the bottom of the heightening device and the module bottom are adjacent to each other during use and are both arranged to rest on the same support surface and to be supported by the support surface during use.

5. The beverage preparation machine of claim 1, wherein the beverage preparation module and the heightening device are magnetically constrainable together by the module assembling member and the device assembling member.

6. A beverage preparation machine comprising:
a beverage preparation module comprising a beverage outlet and a module assembling member under the beverage outlet; and
a heightening device for increasing a height of a short cup under the beverage outlet of the beverage preparation module, the heightening device comprising
a bottom for resting on a support surface,
a platform supported by the bottom and configured for receiving the short cup and increasing the height of the short cup over the bottom,
a device assembling member for connecting the bottom and the platform as a unit to the module assembling member under the beverage outlet, the device assembling member and the module assembling member are disconnectable from each other,
the device assembling member has a device element, and the module assembling member has a module element, the beverage preparation machine has a configuration selected from the group consisting of (i) the device element is a magnetic field-generating element, and the module element is a ferromagnetic element, and (ii) the device element is a ferromagnetic element, and the module element is a magnetic field-generating element,
the device element having an average magnetic field axis that is off-set above an average magnetic field axis of the module element, so that the heightening device is urged downwards by the beverage preparation module.

7. The beverage preparation machine of claim 5, wherein the heightening device comprises a device support member, and the beverage preparation module comprises a module support member, the device support member supports a device element, and the module support member supports a module element, the device element and the module element forming the module assembling member and the device assembling member magnetically constrainable together when the device element and the module element are magnetically constrained together.

* * * * *